US011619860B1

(12) United States Patent
Bonn et al.

(10) Patent No.: US 11,619,860 B1
(45) Date of Patent: Apr. 4, 2023

(54) CANTILEVER DEVICE FOR SHIFTING OPTICALLY NONLINEAR CRYSTAL

(71) Applicant: Coherent LaserSystems GmbH & Co. KG, Göttingen (DE)

(72) Inventors: Henning Bonn, Lübeck (DE); Rüdiger Von Elm, Wielen/Wahlstorf (DE); Christian Kannengiesser, Lübeck (DE)

(73) Assignee: Coherent LaserSystems GmbH & Co. KG, Göttingen (DE)

( * ) Notice: Subject to any disclaimer, the term of this patent is extended or adjusted under 35 U.S.C. 154(b) by 0 days.

(21) Appl. No.: 17/486,603

(22) Filed: Sep. 27, 2021

(51) Int. Cl.
*G02F 1/35* (2006.01)
*H02N 2/06* (2006.01)
*G02F 1/355* (2006.01)

(52) U.S. Cl.
CPC ............ *G02F 1/3505* (2021.01); *H02N 2/06* (2013.01); *G02F 1/3551* (2013.01)

(58) Field of Classification Search
CPC .................................................. G02F 1/3505
See application file for complete search history.

(56) References Cited

U.S. PATENT DOCUMENTS

| 4,374,402 A | 2/1983 | Blessom et al. |
| 6,859,335 B1 * | 2/2005 | Lai ........................ G02F 1/3525 356/124 |
| 8,482,846 B2 | 7/2013 | Kneip |
| 9,362,716 B2 * | 6/2016 | Swanbeck ........... H01S 5/02365 |
| 9,429,814 B2 * | 8/2016 | Zanger ...................... G02F 1/39 |
| 10,312,659 B1 | 6/2019 | Hollemann et al. |
| 10,416,531 B2 * | 9/2019 | Mittler ...................... G02F 1/35 |
| 2016/0079725 A1 | 3/2016 | Zanger |
| 2016/0087394 A1 | 3/2016 | Swanbeck et al. |
| 2019/0004395 A1 | 1/2019 | Mittler et al. |

OTHER PUBLICATIONS

International Search Report and Written Opinion received for International Patent Application No. PCT/EP2022/075866 dated Jan. 20, 2023, 14 pages.
Jung et al., (2017). "Tunable dual-band bandpass filter using piezo-electric transducer (PET)," 2017 USNC-URSI Radio Science Meeting (Joint With AP-S Symposium), IEEE, pp. 13-14.

* cited by examiner

*Primary Examiner* — Rhonda S Peace
(74) *Attorney, Agent, or Firm* — Morrison & Foerster LLP (57) ABSTRACT

A device for shifting a nonlinear crystal arranged to frequency convert a laser beam includes an anchor, a mount for holding the nonlinear crystal, and two parallel flexures each interconnecting the mount and the anchor to cantilever the mount from the anchor. Each flexure extends in a first horizontal direction from the mount to the anchor. The two flexures being offset from each other in a vertical direction. The device also includes a transducer connecting between the anchor and the mount. Bending of the transducer shifts the position of the mount in the vertical direction, and the two parallel flexures cooperate to prevent rotation of the mount during shifting of the mount position induced by the transducer. This device provides an inexpensive and compact crystal-shifter solution with crystal-orientation stability equaling that of far more costly and bulky conventional translation stages.

20 Claims, 8 Drawing Sheets

CANTILEVER DEVICE FOR SHIFTING OPTICALLY NONLINEAR CRYSTAL

TECHNICAL FIELD OF THE INVENTION

The present invention relates in general to frequency conversion of a laser beam in an optically nonlinear crystal, with at least the frequency-converted laser beam being ultraviolet and of sufficient power to cause ultraviolet damage to the nonlinear crystal. In particular, the present invention relates to compact and inexpensive devices for spatially shifting the nonlinear crystal to mitigate ultraviolet damage and thereby extend the life of the nonlinear crystal.

DISCUSSION OF BACKGROUND ART

Ultraviolet (UV) refers to the region of the electromagnetic spectrum between visible light and x-rays. Most broadly defined, the wavelength range of UV light is between 10 and 400 nanometers (nm). UV laser radiation has a variety of uses. High-power UV laser radiation is used to perform photolithography, laser machining, and eye surgery, for example, while moderate-power UV laser radiation has other applications such as semiconductor inspection, flow cytometry, and confocal microscopy.

In many situations, solid-state lasers are a preferred laser-source architecture. However, so far, no solid-state laser is capable of directly generating UV laser radiation with high or even moderate power. Instead, UV laser radiation is generated from solid-state lasers by frequency conversion of longer-wavelength laser radiation generated in the solid-state-laser gain medium. For example, a neodymium-doped yttrium aluminum garnet (Nd:YAG) crystal very effectively generates laser radiation with a wavelength of 1064 nm, and forms the basis of many commonly used UV solid-state laser systems. The 1064 nm laser radiation is converted to UV laser radiation through harmonic generation in one or more optically nonlinear crystals. A wavelength of 266 nm may be reached by two sequential stages of frequency doubling, and a wavelength of 355 nm may be reached by partial frequency doubling followed by sum-frequency-mixing of the frequency-doubled laser radiation with residual unconverted 1064 nm laser radiation.

Efficient frequency conversion in a nonlinear crystal relies on the input laser beam (or beams) being phase matched with the frequency-converted laser beam, such that, as the input and frequency-converted laser beams propagate through the nonlinear crystal, frequency-converted laser radiation generated at each spatial location interferes constructively with frequency-converted laser radiation generated at preceding spatial locations. This is a nontrivial task since the refractive index of the nonlinear crystal varies with wavelength. Depending on the wavelengths and the type of nonlinear crystal used, critical or non-critical phase matching may be used. Critical phase matching, also known as "angle phase matching", utilizes a birefringent nonlinear crystal and takes advantage of the polarization dependence of the refractive index of the birefringent nonlinear crystal. The angle of incidence of the input laser beam (or beams), relative to the crystal axes, is selected such that the refractive index is the same for the input laser beam(s) and the frequency-converted laser beam. In non-critical phase matching, also known as "temperature phase matching", the nonlinear crystal is kept at a temperature where the refractive index is the same for the respective wavelengths of the input and frequency-converted laser beams, while these beams travel along a common axis in the nonlinear crystal. Non-critical phase matching is only possible when such a temperature exists. Non-critical phase matching typically requires heating the nonlinear crystal to an elevated temperature. While non-critical phase matching is less sensitive than critical phase matching to alignment errors between the crystal axes and the laser beam propagation and polarization directions, optimal performance requires minimizing such errors.

Most nonlinear crystals are susceptible to damage from a UV laser beam. This is particularly troublesome when the UV laser beam has high intensity, such as with laser beams having an average power in excess of a watt. In addition, since the absorption coefficient of most nonlinear crystals increases steeply as the wavelength decreases from 500 nanometers, UV damage at relatively shorter wavelengths may also be a concern even at more moderate average-powers, e.g., 10-100 milliwatt, especially if the fundamental laser radiation is focused in the nonlinear crystal. In these situations, the portion of the nonlinear crystal exposed to the UV laser beam gradually deteriorates, resulting in reduced frequency conversion efficiency and degraded UV laser beam quality. This UV-induced deterioration may be mitigated by periodically shifting the position of the nonlinear crystal, in a direction that is transverse to the propagation direction of the incident laser exposed to UV laser radiation, so as to avoid passing the laser beam through a damaged portion of the nonlinear crystal. For this purpose, the nonlinear crystal is sometimes mounted on one or two linear translation stages.

A conventional linear translation stage has a sled that is mounted on one or more rails of a fixed support. The sled may be moved along the rails by a micrometer screw, for example driven by a micro-motor or micro-stepper. Precision machined surfaces and often also an advanced bearing configuration are necessary to maintain precise control over the position of the sled.

SUMMARY OF THE INVENTION

Disclosed herein is a device for holding and shifting the position of an optically nonlinear crystal used to frequency-convert a laser beam. This crystal shifter is useful in UV laser apparatuses where a UV laser beam propagating in the nonlinear crystal may cause local damage to the crystal material, either interiorly or at the surface. In such apparatuses, the present crystal shifter may be used to shift the nonlinear crystal relative to the propagation path of the UV laser beam so as to avoid actively using a UV damaged portion of the nonlinear crystal. In this context, the present crystal shifter offers a cost-effective and compact alternative to conventional translation stages.

In the present crystal shifter, a mount for a nonlinear crystal is cantilevered from an anchor via two parallel flexures. The two parallel flexures are offset from each other in a vertical direction. The position of the mount, relative to the anchor, is controlled by a piezoelectric bending transducer connecting between the anchor and the mount. The piezoelectric bending transducer is bendable via the piezoelectric effect. The piezoelectric bending transducer is arranged such that a change in its degree of bending changes the vertical position of the mount. The two parallel flexures cooperate to restrict the movement of the mount to translation, without rotation. In operation, when a nonlinear crystal is coupled to the mount, the two parallel flexures thus maintain the orientation of the nonlinear crystal and thereby also maintain the phase matching needed for optimal frequency conversion. In contrast, had the mount been cantilevered from the anchor via only a single flexure, actuation by the piezoelectric bending transducer would cause the mount and single flexure to perform a more pivot-like movement, thus rotating the mount and the nonlinear crystal. This rotation would likely result in an undesirable, and in many cases unacceptable, deviation from the phase matching condition.

The mechanical structure consisting of the anchor, flexures, and mount is a relatively simple structure that can be manufactured at low cost. For example, this structure may be integrally formed from a solid metal block using inexpensive machining techniques such as wire-erosion. The bending transducer is also relatively affordable, and the overall cost of the crystal shifter may be significantly less than that of a conventional translation stage. Yet, by virtue of the two parallel flexures, the accuracy with which the crystal shifter maintains the orientation of the nonlinear crystal equals or even outperforms that of many high-precision conventional translation stages.

The crystal shifter may be made compact, for example with its largest dimension being about 50 millimeters (mm) or less. This largest dimension may be defined by the amount of travel required for the nonlinear crystal and the resulting length necessary for the piezoelectric bending transducer.

The crystal shifter is compatible with heating of the nonlinear crystal, if needed for phase matching. Heating functionality may be integrated in the mount to heat the nonlinear crystal via the mount, and the flexures provide temperature isolation between the mount and the anchor.

In one aspect, a device for shifting a nonlinear crystal arranged to frequency convert a laser beam includes (a) an anchor, (b) a mount for holding the nonlinear crystal, (c) two parallel flexures, and (d) a transducer. The two parallel flexures each interconnect the mount and the anchor to cantilever the mount from the anchor. Each flexure extends in a first horizontal direction from the mount to the anchor. The two flexures are offset from each other in a vertical direction. The transducer connects between the anchor and the mount. Bending of the transducer shifts the position of the mount, relative to the anchor, in the vertical direction. The two parallel flexures cooperate to prevent rotation of the mount, relative to the anchor, during shifting of the mount position induced by the transducer.

BRIEF DESCRIPTION OF THE DRAWINGS

The accompanying drawings, which are incorporated in and constitute a part of the specification, schematically illustrate preferred embodiments of the present invention, and together with the general description given above and the detailed description of the preferred embodiments given below, serve to explain principles of the present invention.

DETAILED DESCRIPTION OF THE INVENTION

Figure 1:
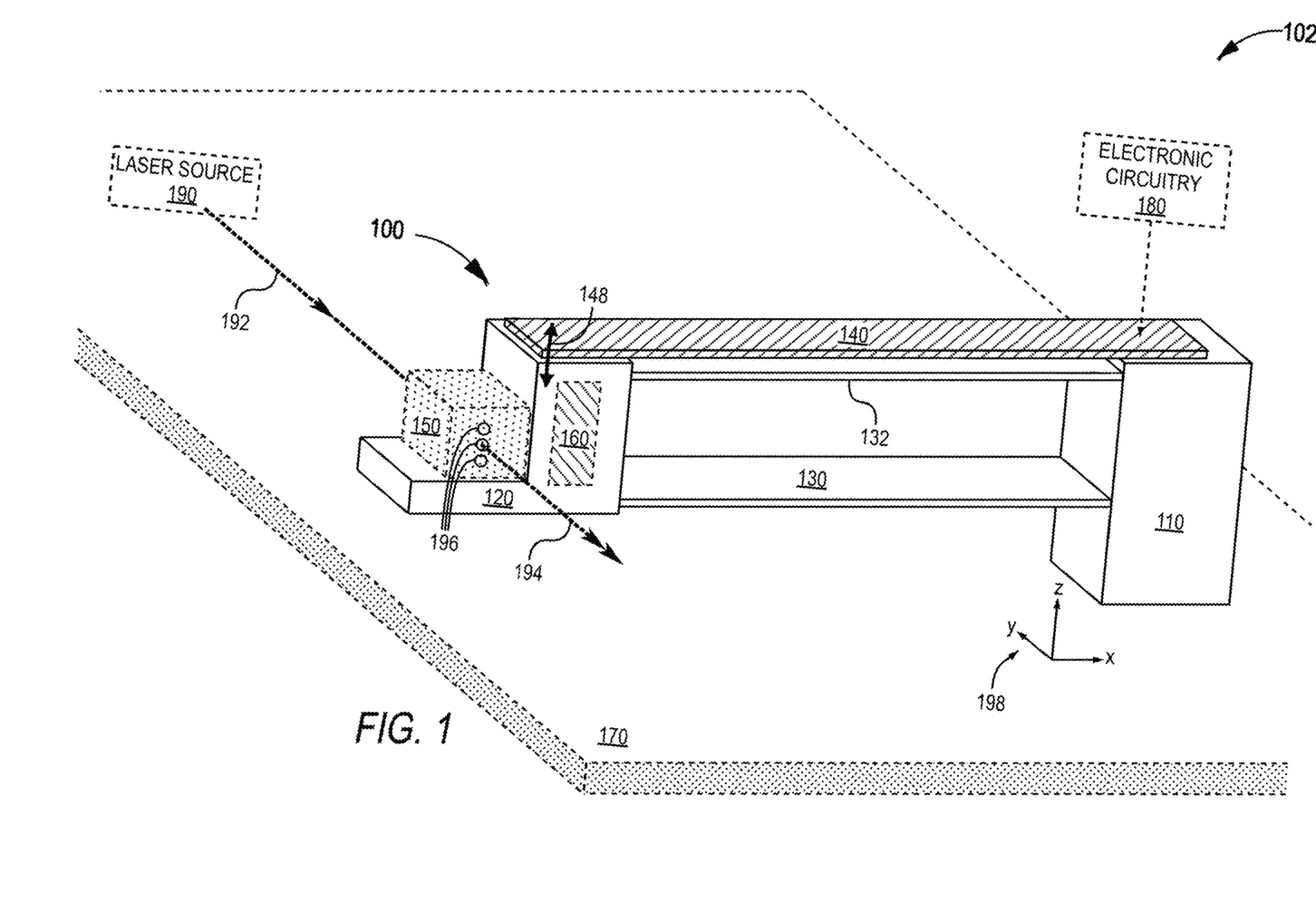
FIG. 1 illustrates a crystal-shifting device for holding and shifting a nonlinear crystal, according to an embodiment. This crystal shifter includes a piezoelectric bending transducer for actuation, and implements two parallel flexures to prevent rotation of the nonlinear crystal.

Referring now to the drawings, wherein like components are designated by like numerals, FIG. 1 illustrates one crystal-shifting device 100 for holding and shifting a nonlinear crystal 150. Crystal shifter 100 may position nonlinear crystal 150 in the propagation path of a laser beam 192 for frequency conversion of laser beam 192 to generate a frequency-converted laser beam 194, with at least one of laser beams 192 and 194 being ultraviolet.

In one scenario, laser beam 192 is visible and nonlinear crystal 150 frequency-doubles laser beam 192 such that laser beam 194 is ultraviolet. For example, laser beam 192 may be the frequency-doubled output of a solid-state laser with a neodymium-doped yttrium aluminum garnet (Nd:YAG) gain crystal and have a wavelength of 532 nm, such that laser beam 194 has a wavelength 266 nm. In another example of this scenario, laser beam 192 is a 640 nm laser beam generated by a solid-state laser with a praseodymium-doped yttrium lithium fluoride (Pr:YLF) gain crystal, such that the wavelength of laser beam 194 is 320 nm. In another scenario, laser beam 192 is incident on nonlinear crystal 150 together with a second incident laser beam (not depicted in FIG. 1), and laser beam 194 is generated from sum-frequency mixing between laser beam 192 and this second incident laser beam. In one example of this scenario, laser beam 192 is the 532 nm frequency-doubled output of the Nd:YAG laser mentioned above, while the second incident laser beam is a residual non-frequency-converted portion of the original output laser beam of the Nd:YAG laser with a wavelength of 1064 nm, such that laser beam 194 has a wavelength of 355 nm.

Crystal shifter 100 includes an anchor 110, a mount 120, two parallel flexures 130 and 132, and a piezoelectric bending transducer 140. Mount 120 is configured to hold nonlinear crystal 150. Each of flexures 130 and 132 interconnects mount 120 and anchor 110 to cantilever mount 120 from anchor 110. In operation, anchor 110 is attached to a structural support 170, for example a baseplate as depicted in FIG. 1, and mount 120 holds nonlinear crystal 150. Each of flexures 130 and 132 extends in a horizontal direction from anchor 110 to mount 120. Flexures 130 are 132 are offset from each other in a vertical direction. The orientation of flexures 130 and 132 may or may not be exactly horizontal, but is generally predominantly horizontal. Even if flexures 130 and 132 are designed to be planar and horizontal when unstressed, they may deviate from a planar shape and horizontal orientation when forced to flex. Thus, flexures 130 and 132 may extend in both the horizontal direction and the vertical direction, at least when stressed.

Herein, the terms horizontal and vertical are defined relative to anchor 110. Depending on the orientation of anchor 110, the terms horizontal and vertical, as used herein, may or may not correspond to horizontal and vertical relative to the direction of gravity. Related terms, such as top, bottom, above, and below, are derived from the present definition of horizontal and vertical relative to anchor 110. FIG. 1 shows a cartesian coordinate system 198 referenced to anchor 110. The x-axis and y-axis of coordinate system 198 are horizontal, and the z-axis is vertical. Each of flexures 130 and 132 extends between anchor 110 and mount 120 at least along the x-axis, and flexures 130 and 132 are offset from each other in the z-dimension.

Transducer 140 connects between anchor 110 and mount 120. FIG. 1 shows transducer 140 in a planar state. However, the piezoelectric nature of transducer 140 causes transducer 140 to bend upon application of suitable voltages. In crystal shifter 100, transducer 140 is arranged to bend in the xz-dimensions, as indicated by arrow 148, and thereby shift the position of mount 120 in the xz-dimensions. (Herein, the xz-dimensions refer to dimensions parallel to the xz-plane. Thus arrow 148 is in a plane parallel to the xz-plane.) Such shifting of mount 120 forces flexures 130 and 132 to change shape. However, the two parallel flexures 130 and 132 cooperate to restrict the possible movement of mount 120 and, specifically, cooperate to prevent rotation of mount 120 relative to anchor 110 in the xz-dimensions. In contrast, had mount 120 been cantilevered from anchor 110 via only a single flexure, actuation by transducer 140 would cause mount 120 and the single flexure to perform a more pivot-like movement, thus rotating mount 120 and nonlinear crystal 150 in the xz-dimensions. This rotation would likely result in an undesirable, and in many cases unacceptable, deviation from phase matching condition. The constraint added by a second, parallel flexure in crystal shifter 100 ensures that crystal shifter 100 maintains the orientation of nonlinear crystal 150. Crystal shifter 100 is therefore capable of maintaining a phase matching condition during shifting of nonlinear crystal 150.

In operation, nonlinear crystal 150 intercepts laser beam 192 to generate frequency-converted laser beam 194 therefrom, and crystal shifter 100 shifts the position of nonlinear crystal 150 to mitigate UV damage caused by one or both of laser beams 192 and 194 (typically laser beam 194). For example, as depicted in FIG. 1, crystal shifter 100 may place nonlinear crystal 150 at three different positions over time, corresponding to laser beams 192 and 194 passing through three different portions 196 of nonlinear crystal 150 over time. In this example, crystal shifter 100 triples the life of nonlinear crystal 150. The total amount of vertical travel provided by crystal shifter 100 may be in the range between 200 micrometers (μm) and 3 mm.

While the design of crystal shifter 100 with two parallel flexures 130 and 132 intrinsically prevents rotation of mount 120, manufacturing tolerances and other imperfections may result in a small amount of rotation. Yet, one example of crystal shifter 100 has demonstrated less rotation than that typical of high-performance conventional translation stages. Certain embodiments of crystal shifter 100 limit the rotation of mount 120 to less than 0.02° degrees in the xz-dimensions for 0.3 mm of travel of mount 120 along the z-axis.

As illustrated in FIG. 1, each of flexures 130 and 132 may be a blade flexure oriented to prevent flexing out of the xz-dimensions, that is, with the thinnest dimension of the blade being parallel to the xz-plane and generally at least nearly parallel to the z-axis. Out-of-plane flexing may occur if (a) flexures 130 and 132 have only low rigidity against flexing out of the xz-dimensions and (b) the pressure applied on mount 120 by transducer 140 is not centered on mount 120 in the y-dimension, as may occur due to non-idealities in the bending properties or positioning of transducer 140. Properly oriented blade flexures have relatively high rigidity against such out-of-plane flexing, and thereby relaxes the requirements to y-axis-centering of the force from transducer 140 on mount 120. In one implementation, the force applied on mount 120 by transducer 140 is centered on mount 120 in the y-dimension to within 0.5 percent of the length of transducer 140 along the x-axis.

As an alternative to blade flexures, each flexure 130 and 132 may be a notch flexure with two or more notches. Each notch is parallel to the y-axis and provides the flexibility that allows transducer 140 to shift the position of mount 120 in the xz-dimensions, while other flexure segments away from the notches are relatively rigid. In a manner similar to blade flexures, notch flexures prevent out-of-plane flex. However, blade flexures are usually simpler to manufacture and may be less prone to failure by distributing stress over a greater area.

Anchor 110, mount 120, and flexures 130 and 132 may be portions of a single, integrally formed structure. This integrally formed structure eliminates the need to assemble separate parts and also reduces the risk of flexures 130 and 132 detaching from anchor 110 or mount 120 when stressed by the action of transducer 140. Additionally, this integrally formed structure may be manufactured inexpensively using, for example, wire erosion. One such integrally formed structure is discussed below in reference to FIGS. 4A-C.

Crystal shifter 100 may include nonlinear crystal 150 attached to mount 120, or be provided without nonlinear crystal 150 but ready for a separately sourced nonlinear crystal 150 to be mounted thereto. Crystal shifter 100 may be implemented in a UV laser apparatus 102 that, in additional to crystal shifter 100, includes a laser source 190 that generates laser beam 192. Apparatus 102 may also include electronic circuitry 180 that applies suitable voltages to transducer 140 to control its bending state. Additionally, apparatus 102 may include support structure 170, in which case laser source 190 may be disposed on support structure 170 together with crystal shifter 100.

In certain embodiments, mount 120 includes a heater 160 that heats nonlinear crystal 150 to a temperature required for phase matching. Heater 160 may be in direct contact with nonlinear crystal 150. Alternatively, heater 160 is not in direct contact with nonlinear crystal 150 but instead heats nonlinear crystal 150 via mount 120. Although not shown in FIG. 1, apparatus 102 may further include electronic circuitry that controls the amount of heat generated by heater 160.

Transducer 140 is, for example, a unimorph bending piezo, a 2-layer bimorph bending piezo, or a multilayer bimorph bending piezo. Each of these bending piezos will form a single arc when bent, as opposed to a more complex curvature such as an S-shape. The 2-layer bimorph bending piezo has a pair of piezoelectric sheets, each oriented generally horizontally in crystal shifter 100. The polarity of each of the two sheets is parallel to its thickness dimension, that is, vertical in crystal shifter 100. When a voltage is applied to a piezoelectric sheet in the same direction as the polarity, the thickness of the sheet expands and, as a result, its length and width dimensions contract. (The more widely used piezoelectric extension transducers are based on the thickness expansion.) Application of asymmetric voltages to the two sheets result in dissimilar thickness expansion and dissimilar length/width contraction between the two sheets. As a result, the sheet pair develops a curvature. The curvature is monotonic such that the bending piezo forms a single arc. When the length of transducer 140 is much greater than its width, the resulting bending is much more pronounced in the xz-dimensions than in the yz-dimensions. The 2-layer bimorph bending piezo bends upwards when the top sheet is contracted lengthwise relative to the bottom sheet. Similarly, the 2-layer bimorph bending piezo bends downwards when the bottom sheet is contracted lengthwise relative to the top sheet. The unimorph bending piezo is simpler than the 2-layer bimorph bending piezo with just a single piezoelectric sheet disposed on a passive, rigid substrate. When the length of the single piezoelectric sheet is piezoelectrically contracted relative to the length of the substrate, the unimorph bending piezo develops a curvature. However, in contrast to the 2-layer bimorph bending piezo, the unimorph bending piezo is not capable of bidirectional bending and its range of travel is reduced accordingly. In embodiments requiring bidirectional bending, crystal shifter 100 may implement transducer 140 as a bimorph bending piezo. Bidirectional bending may be helpful to achieve a desired translation range for nonlinear crystal 150.

Figure 2A:
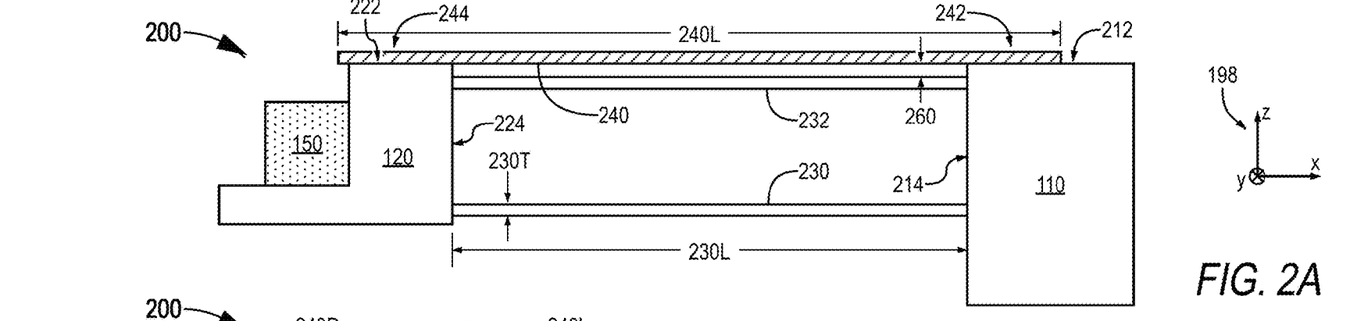
FIGS. 2A-C illustrate a crystal shifter with two identical blade flexures and a piezoelectric bending transducer arranged such that a planar rest-state of the transducer corresponds to the blade flexures being planar, according to an embodiment.
Figure 2B:
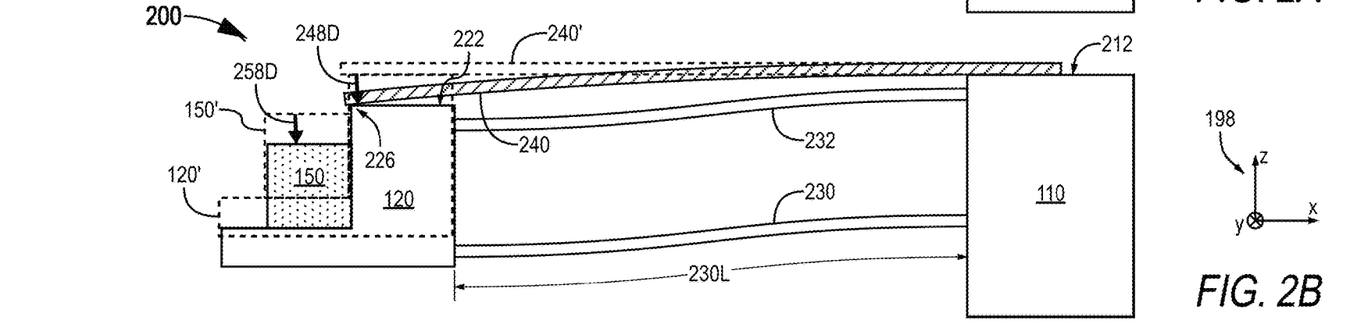
Figure 2C:
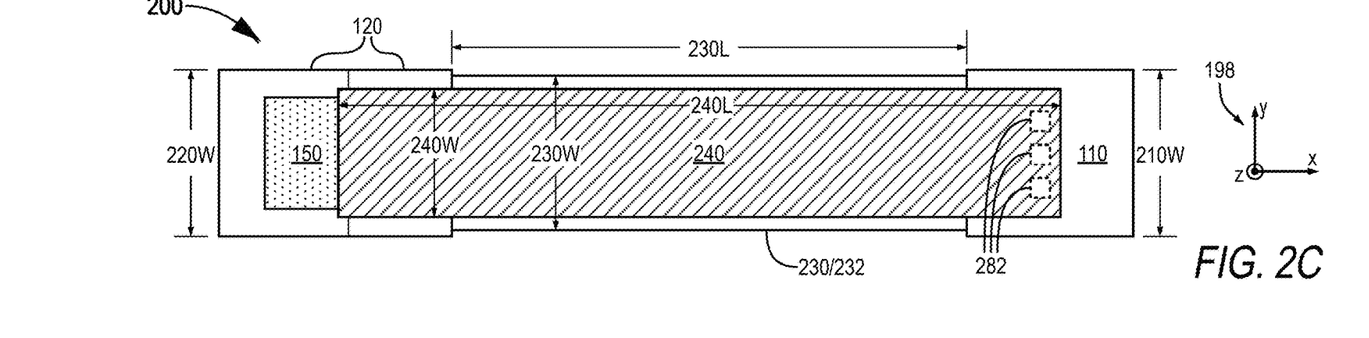

As compared to the linear displacement by a piezoelectric extension transducer, significantly greater displacement can be achieved with a piezoelectric bending transducer. However, bending of transducer 140 is impeded by flexures 130 and 132, thereby reducing the achievable displacement compared to a device lacking these flexures. To counteract this impedance, transducer 140 may be a multilayer bending piezo. In one example, transducer 140 is a multilayer bimorph bending piezo that includes several 2-layer bimorph bending piezos stacked on top of each other. Together, these several 2-layer bimorph bending piezos are capable of generating a greater force than a single 2-layer bimorph bending piezo. FIGS. 2A-C illustrate one crystal shifter 200 with two identical blade flexures and a piezoelectric bending transducer arranged such that a planar rest-state of the transducer corresponds to the blade flexures being planar. Crystal shifter 200 is an embodiment of crystal shifter 100 that (a) implements flexures 130 and 132 as blade flexures 230 and 232, respectively, and (b) implements transducer 140 as a single-arc transducer 240. FIG. 2A is a side-view of crystal shifter 200 in an unstressed state where transducer 240 is planar and does not exert force on mount 120. FIG. 2B is a side-view of crystal shifter 200 in a stressed state where transducer 240 is bent downwards to push down mount 120. FIG. 2C is a top view of crystal shifter 200.

Each of blade flexures 230 and 232 has a length 230L, a width 230W, and a thickness 230T. Thickness 230T is smaller than each of length 230L and width 230W. Thickness 230T is parallel to the xz-plane, and generally at least nearly parallel to the z-axis, to promote flexing of blade flexures 230 and 232 within the xz-dimensions while resisting flexing out of the xz-dimensions. Blade flexures 230 and 232 are aligned with each other in the x-dimension, such that there is no offset between blade flexures 230 and 232 in this dimension. Each of blade flexures 230 and 232 extends between a vertical surface 214 of anchor 110 and a vertical surface 224 of mount 120. Thus, blade flexures 230 and 232 span the same range of coordinates along the x-axis. In certain implementations, blade flexures 230 and 232 span the same range of coordinates along the y-axis as well, such that there is no horizontal offset between blade flexures 230 and 232.

Transducer 240 has a length 240L that exceeds length 230L. One end 242 of transducer 240 is affixed to an upward-facing surface 212 of anchor 110, and the opposite end 244 of transducer 240 is in contact with an upward-facing surface 222 of mount 120. A non-zero gap 260 exists between transducer 240 and blade flexure 232 (the uppermost blade flexure) along the entire length and width of blade flexure 232.

In the unstressed state of crystal shifter 200, blade flexures 230 and 232 are planar, and surfaces 242 and 244 of the transducer 240 are at the same vertical height, as shown in FIG. 2A. When transducer 240 is bent downwards, as shown in FIG. 2B, each of blade flexures 230 and 232 is forced into an S-shape in the xz-dimensions, and mount 120 is translated as indicated by arrow 248D. (FIG. 2B indicates the planar state of transducer 240 as a dashed outline 240'. FIG. 2B further indicates the positions of mount 120 and nonlinear crystal 150 in the unstressed state of crystal shifter 200 as dashed outlines 120' and 150', respectively.) Nonlinear crystal 150 is translated by the same amount as mount 120, as indicated by arrow 258D. Since, in practical implementations, the displacement of mount 120 is small relative to length 230L of blade flexures 230 and 232, the translation of mount 120 and nonlinear crystal 150 is primarily in the downwards vertical direction (negative z-axis direction). However, because length 230L of blade flexures 230 and 232 is unchanged, mount 120 and nonlinear crystal 150 are also translated by a smaller amount in the horizontal direction toward anchor 110 (positive x-axis direction).

Transducer 240 bends in a single arc when actuated, and blade flexures 230 and 232 respond by deforming into an S-shape. Gap 260 prevents interference between transducer 240 and blade flexure 232 during this dissimilar deformation. In one implementation, gap 260 is at least 100 μm.

Transducer 240 may be affixed to surface 212 of anchor 110, and surface 212 may be planar to provide an optimal interface for affixing a planar transducer 240 thereto. Transducer 240 is, for example, affixed to surface 212 by gluing, soldering, or clamping. In the embodiment depicted in FIGS. 2A and 2B, transducer 240 is not affixed to mount 120. Instead transducer 240 and mount 120 are free to slide relative to each other in order to simultaneously accommodate the dissimilar deformations of (a) blade flexures 230 and 232 and (b) transducer 240. In the embodiment depicted in FIGS. 2A and 2B, this free contact interface between transducer 240 and mount 120 does not enable transducer 240 to shift mount 120 upwards from its unstressed state (see FIG. 2A), and crystal shifter 200 is configured for only uni-directional shifting of mount 120. In this embodiment, transducer 240 may be a unimorph bending piezo.

If crystal shifter 200 is required to perform bidirectional shifting of mount 120, a bracket may be added to mount 120 above surface 222, and end 244 of transducer 240 may be seated loosely between surface 222 and this bracket. In this bidirectional-shifting embodiment, transducer 240 may be a bimorph bending piezo, for example a multilayer bimorph bending piezo. An alternative solution with bidirectional shifting is discussed below in reference to FIGS. 3A-C.

In a modification of crystal shifter 200, transducer 240 is affixed to surface 222 of mount 120 and in contact with, but not affixed to, surface 212 of anchor 110. In this modification, downward bending of transducer 240 causes mount 120 to rise in the positive x-axis direction.

In the embodiment depicted in FIGS. 2A-C, transducer 240 extends beyond surface 222 of mount 120 in the negative x-axis direction such that, when transducer 240 is bent downward (see FIG. 2B), transducer 240 interfaces with and acts on the most distant edge 226 of surface 222. The most compact configuration that maximally utilizes the piezoelectrically induced bending of transducer 240 is achieved when edge 226 is positioned as far from anchor 110 as possible (i.e., as far to the left as possible in FIGS. 2A-C) while still remaining in contact with end 244 of transducer 240 throughout its range of travel. However, crystal shifter 200 will also function with end 244 of transducer 240 terminating on surface 222.

FIG. 2C shows an exemplary relationship between width 210W of anchor 110, width 220W of mount 120, width 230W of each of blade flexures 230 and 232, and width 240W of transducer 240. In this example, width 230W exceeds width 240W, and widths 210W and 220W are identical and exceed width 230W. Without departing from the scope hereof, the relationships between widths 210W, 220W, 230W, and 240W may be different from those depicted in FIG. 2C. In one embodiment, anchor 110, mount 120, and blade flexures 230 and 232 are different portions of a single, integrally formed structure machined from a solid block, and widths 210W, 220W, and 230W are identical.

In one implementation, length 230L is in the range between 10 and 30 mm, thickness 230T is in the range between 0.1 and 0.5 mm, length 240L is at least about 5 mm longer than length 230L, and each of widths 210W, 220W, 230W, and 240W is in the range between 2 and 10 mm.

Transducer 240 has at least two electrical contacts 282 where external voltages are applied to control the piezoelectrically induced bending of transducer 240. Electrical contacts 282 may be connected to electronic circuitry 180. In one implementation, electrical contacts 282 are disposed on an upward facing surface of end 242 of transducer 240.

Figure 3A:
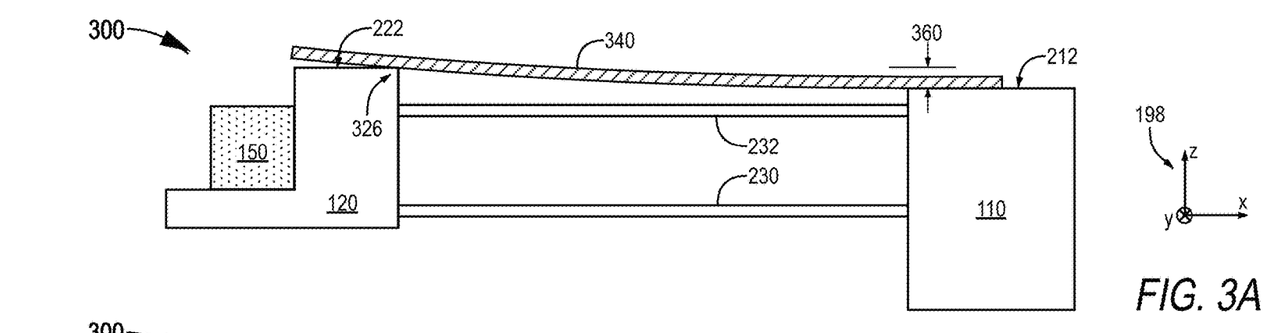
FIGS. 3A-C illustrate a pre-stressed crystal shifter configured to utilize bidirectional bending of a piezoelectric bending transducer, according to an embodiment.
Figure 3B:
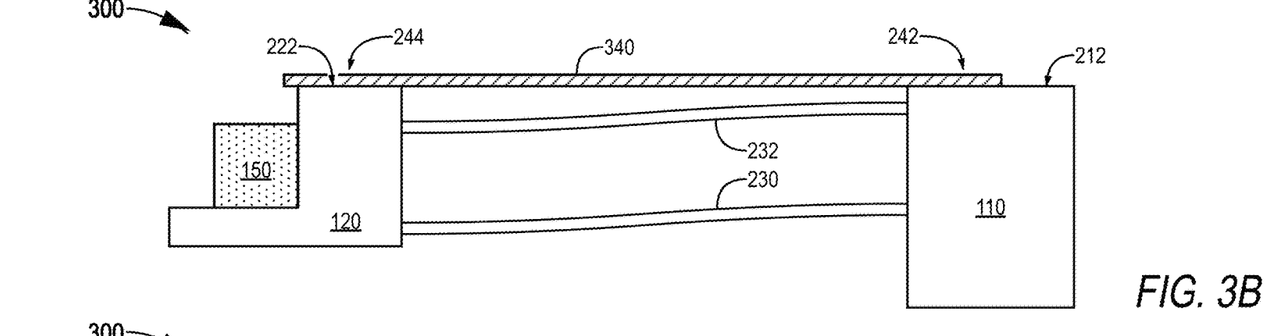
Figure 3C:
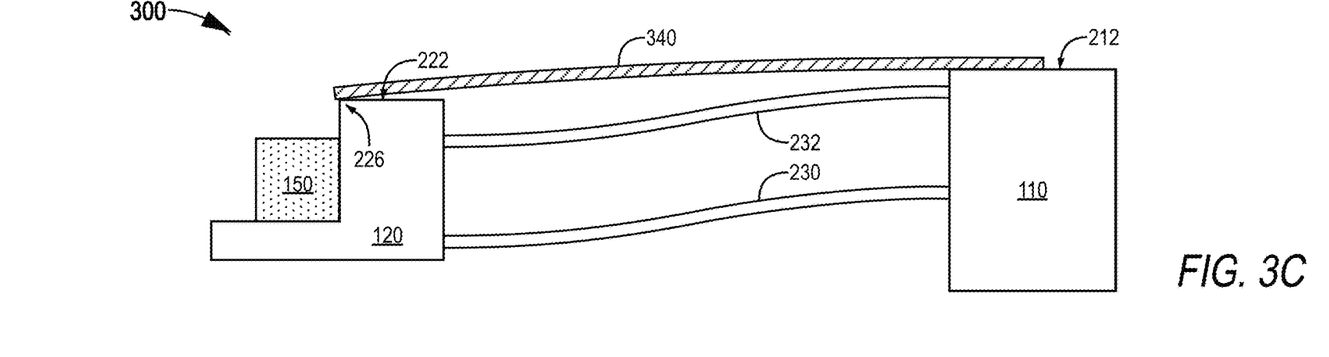

FIGS. 3A-C illustrate one pre-stressed crystal shifter 300 configured to utilize bidirectional bending of a piezoelectric bending transducer. Crystal shifter 300 is an embodiment of crystal shifter 100. FIGS. 3A, 3B, and 3C show crystal shifter 300 with a piezoelectric bending transducer 340 in an upward-bent state, a planar rest-state, and a downward-bent state, respectively. Transducer 340 is an embodiment of transducer 140 capable of bidirectional bending. Transducer 340 is, for example, a multilayer bimorph bending piezo.

Crystal shifter 300 may be viewed as a modification of crystal shifter 200. As compared to crystal shifter 200, the vertical position of surface 222 of mount 120 is elevated in the vertical direction. When blade flexures 230 and 232 are in their unstressed planar state, surface 222 of mount 120 is elevated by a vertical distance 360 relative to surface 212 of anchor 110. This situation is depicted in FIG. 3A. Because surface 222 is elevated above surface 212, blade flexures 230 and 232 being in their unstressed planar state corresponds to transducer 340 being in an upward-bent state. When transducer 340 is electrically controlled to be in a planar state, blade flexures 230 and 232 take on an S-shape, as shown in FIG. 3B. When transducer 340 is electrically controlled to be in a downward-bent state, the S-shape of blade flexures 230 and 232 is more pronounced, as shown in FIG. 3C.

The elevated position of surface 222 when blade flexures 230 and 232 are in their planar unstressed state, pre-stresses transducer 340. This pre-stressing allows mount 120 to remain in contact with transducer 340 in a range of upward-bent states thereof. Whereas the embodiment of crystal shifter 200 drawn in FIGS. 2A-C is capable only of shifting mount 120 down, and not up, from the planar state of transducer 340, crystal shifter 300 is capable of utilizing both downward and upward bending of transducer 340. Crystal shifter 300 thereby provides a greater range of travel than the embodiment of crystal shifter 200 drawn in FIGS. 2A-C. The range of upward-bent states of transducer 340 accessible by crystal shifter 300 is the range between the planar state of transducer 340 (see FIG. 3B) and the upward-bent state of transducer 340 that corresponds to blade flexures 230 and 232 being in their unstressed planar state. Depending on the size of distance 360, crystal shifter 300 may be capable of achieving up to twice the amount of travel achieved by crystal shifter 200.

In one implementation of crystal shifter 300, distance 360 is in the range between 100 μm and 1.5 mm, and crystal shifter 300 provides a total amount of vertical travel in the range between 300 μm and 3 mm.

In its upward-bent state, transducer 340 acts on an edge 326 of surface 222 closest to anchor 110. As shown in FIGS. 3A-C, end 244 of transducer 340 may extend beyond surface 222 in the direction away from anchor 110. Alternatively, end 244 of transducer 340 may terminate within the footprint of surface 222, as also discussed above for crystal shifter 200 in reference to FIGS. 2A-C.

Figure 4A:
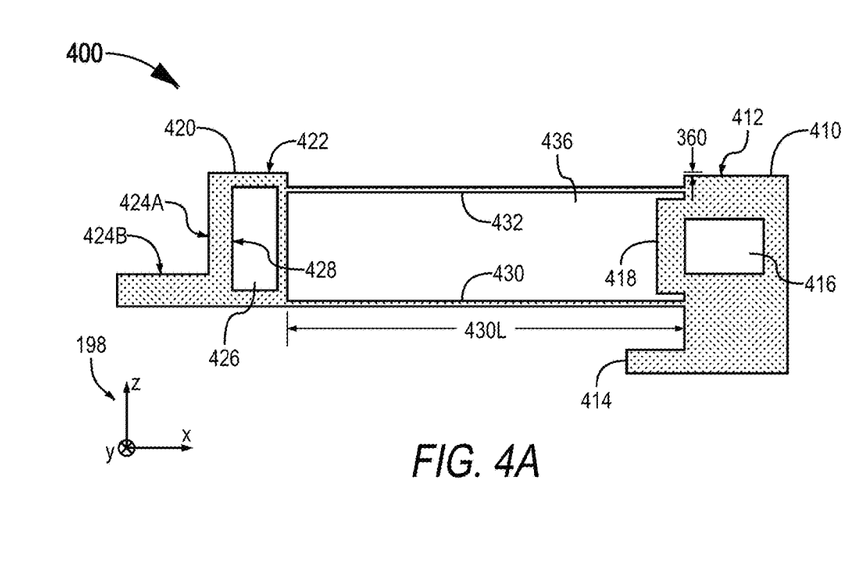
FIGS. 4A-C illustrate an integrally formed structure that may be combined with a piezoelectric bending transducer to form an embodiment of the crystal shifter of FIGS. 3A-C, according to an embodiment.
Figure 4B:
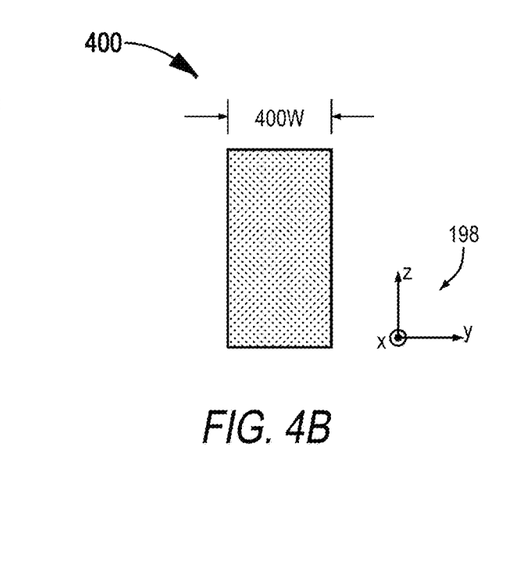
Figure 4C:
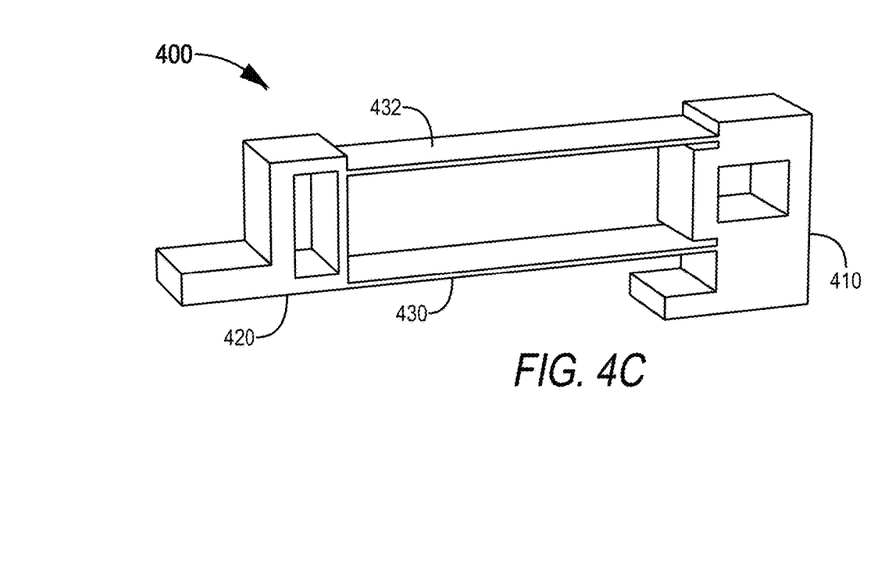

FIGS. 4A-C illustrate one integrally formed structure 400 that may be combined with transducer 340 to form an embodiment of crystal shifter 300. FIGS. 4A, 4B, and 4C are side-, end-, and perspective views, respectively, of structure 400. In the embodiment shown in FIGS. 4A-C, all material portions of structure 400 have the same width 400W in the y-dimension. While a uniform width is not required for structure 400 to function, it provides for a relatively simple manufacturing process. For example, structure 400 may be machined from a solid block, with some portions of the block being removed by wire-erosion.

Structure 400 includes an anchor 410, a mount 420, and two parallel blade flexures 430 and 432, all of which are different portions of a single integrally formed structure. Structure 400 may be made of aluminum or an aluminum alloy, optionally coated with one or more other material. In one example, structure 400 is made of a high-strength aluminum alloy, e.g., 7075 aluminum, to withstand deformation by transducer 340 without breaking.

Anchor 410 has a top surface 412, and mount 420 has a top surface 422. Top surface 422 is elevated relative to top surface 412 by vertical distance 360. When structure 400 is implemented in crystal shifter 300, transducer 340 is affixed to top surface 412 of anchor 410 and in contact with top surface 422.

Structure 400 has at least one aperture, namely aperture 436 defining the length of blade flexures 430 and 432 as well as the vertical offset therebetween. Aperture 436 may be formed by wire erosion. In one example, length 430L of blade flexures 430 and 432 is in the range between 10 and 25 mm. When this example of structure 400 is based on 7075 aluminum and implemented in crystal shifter 300 together with a multilayer bimorph piezo, a total vertical travel of 600 μm may be achievable with a maximum voltage of 60 volts applied to the multilayer bimorph piezo.

Mount 420 may have an aperture 426 sized to accommodate a heater for heating nonlinear crystal 150. In one embodiment, nonlinear crystal 150 is disposed on a horizontal surface 424B of mount 420 and in contact with a vertical surface 424A of mount 420B, and a heater is mounted to a surface 428 of aperture 426, wherein surfaces 424A and 428 are opposite-facing surfaces of the same wall-portion of structure 400. Aperture 426 may be formed by wire-erosion.

The bottom portion of anchor 410 may include a pedestal 414 for securing structure 400 to structural support 170 (see FIG. 1). Whether or not anchor 410 is secured via pedestal 414, anchor 410 may be soldered to structural support 170. Similarly, nonlinear crystal 150 may be soldered to mount 420. For this purpose, at least some portions of structure 400 may be plated with a solderable material. In one such implementation, structure 400 is made of aluminum or an aluminum alloy plated with nickel and gold.

When mount 420 is heated by a heater, it is preferred to have thermal isolation between mount 420 and the portion of anchor 410 interfacing with supporting structure 170, e.g., pedestal 414. Blade flexures 430 and 432, by virtue of a relatively small cross-sectional area in the yz-dimensions and relatively long length 430L, provide a high degree of thermal isolation. In one example, length 430L is in the range between 10 and 25 mm, and the cross-sectional area in the yz-dimensions of each of blade flexures 430 and 432 is less than 2 mm$^2$, for example in the range between 0.5 and 2 mm$^2$.

Optionally, as shown in FIGS. 4A and 4C, anchor 410 has an aperture 416. Aperture 416 may facilitate affixing of transducer 340 to surface 412 by clamping, with one part of the clamp being positioned in aperture 416 and an opposite part of the clamp being disposed on top of transducer 340. In order to maintain stiffness of anchor 410 in the presence of aperture 416, anchor 410 may include a feature 418 that protrudes into aperture 436 and compensates for the loss of stiffness caused by aperture 416.

Figure 5:
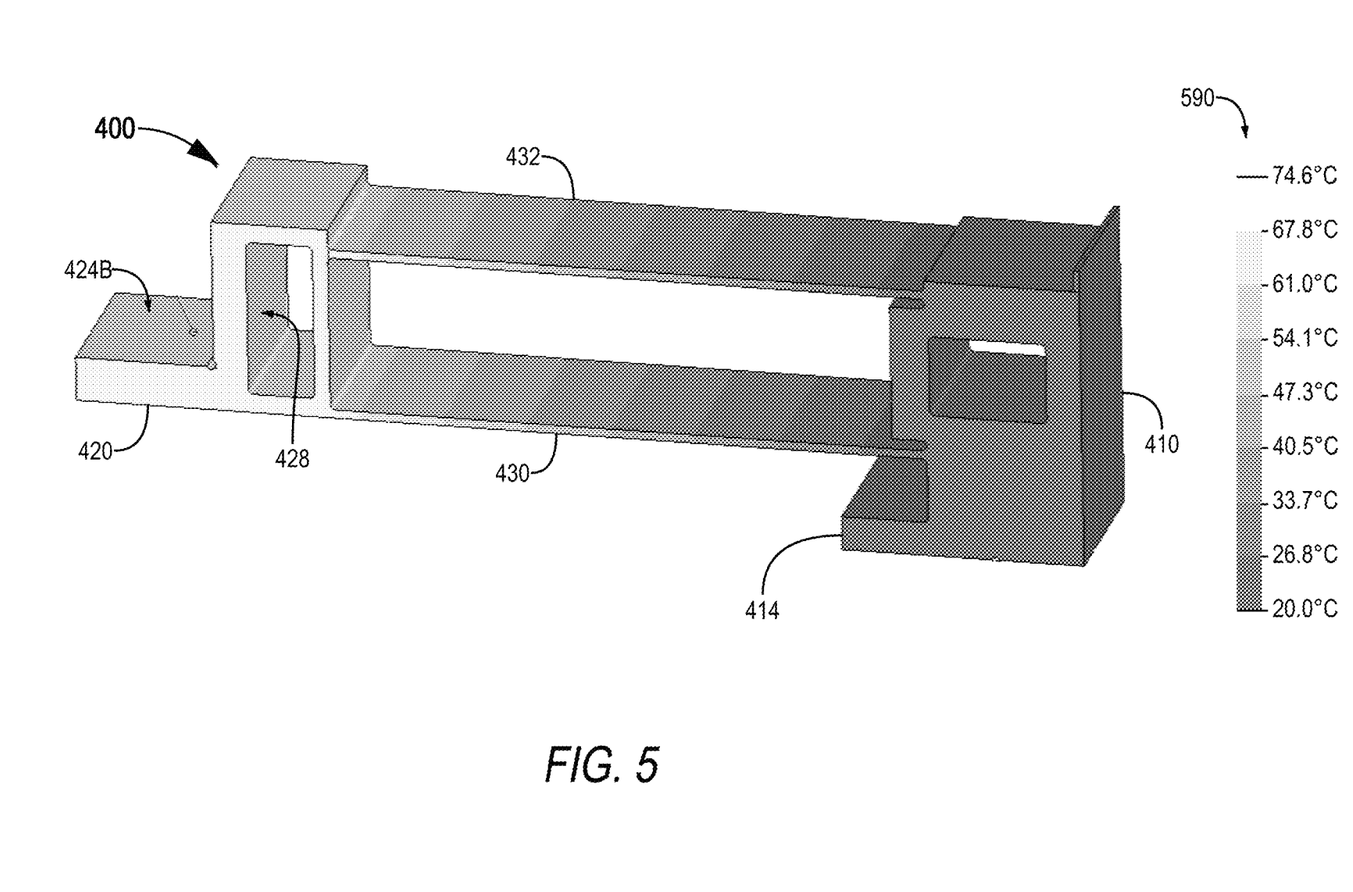
FIG. 5 shows an exemplary, modeled temperature distribution of the integrally formed structure of FIGS. 4A-C when the nonlinear-crystal mount is heated.

FIG. 5 shows one exemplary, modeled temperature distribution of structure 400 when mount 420 is heated. Local temperatures of structure 400 are indicated according to a grayscale 590. In this example, structure 400 is made of 7075 aluminum, length 430L is approximately 17 mm, and each of blade flexures 430 and 432 has a cross-sectional area in the yz-dimensions of 1.125 mm$^2$. One watt of heat is delivered to surface 428 of aperture 426 of mount 420, while pedestal 414 is coupled to a heat sink having a temperature of 20 degrees Celsius (° C.). The heat delivery at surface 428 brings the temperature of surface 424B to approximately 74° C., with the entirety of mount 420 being above or near 68° C. Yet, the thermal isolation provided by blade flexures 430 and 432 results in the entirety of anchor 410 being within about 5° C. of the heat sink temperature of 20° C.

Other embodiments of crystal shifter 100 may benefit from an integrally formed structure similar to structure 400. For example, the design of structure 400 may be modified to position top surfaces 412 and 422 at the same vertical level. This modified version of structure 400 may be implemented in crystal shifter 200.

Figure 6:
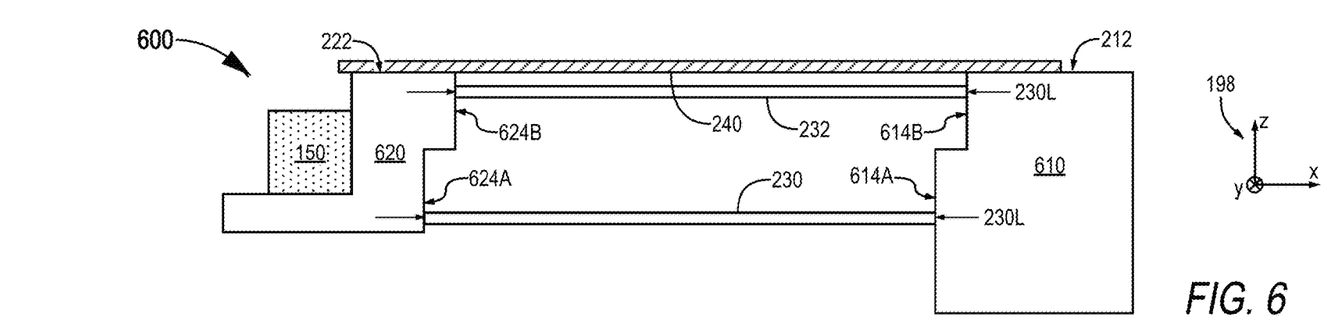
FIG. 6 illustrates a crystal shifter with horizontally-offset blade flexures, according to an embodiment.
Figure 7:
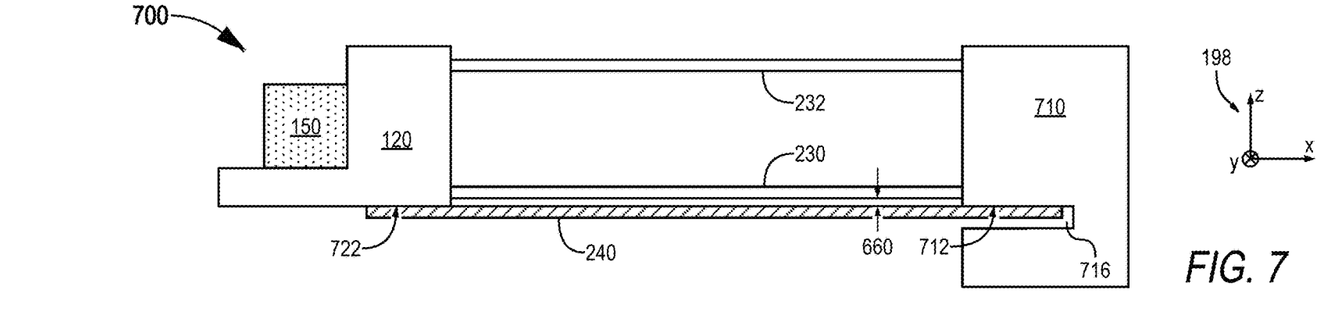
FIG. 7 illustrates a crystal shifter with a piezoelectric bending transducer disposed below, rather than above, a pair of blade flexures, according to an embodiment.
Figure 8:
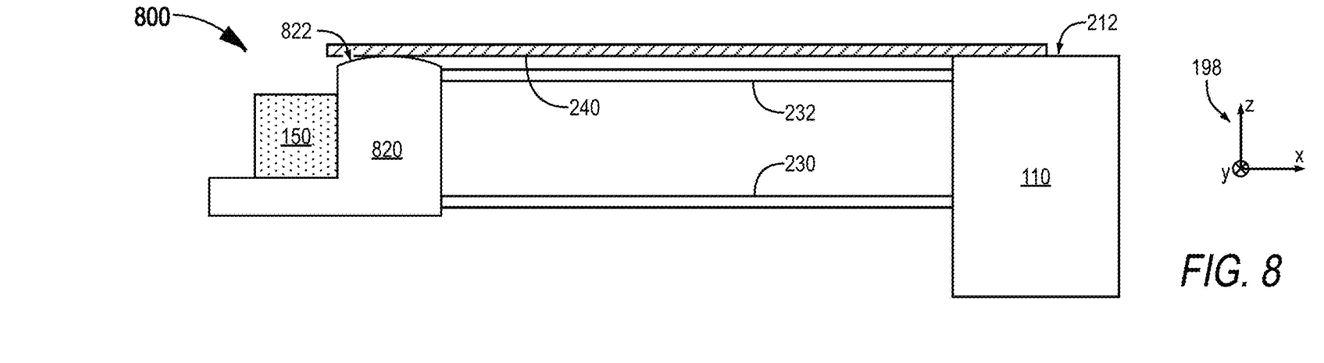
FIG. 8 illustrates a crystal shifter with a convex surface on the nonlinear-crystal mount for interfacing with a piezoelectric bending transducer, according to an embodiment.

FIGS. 6, 7, and 8 show exemplary modifications that may be applied to crystal shifters 200 and 300 and structure 400.

FIG. 6 is a side-view of one crystal shifter 600 with horizontally-offset blade flexures 230 and 232. Crystal shifter 600 is a modification of crystal shifter 200, wherein blade flexures 230 and 232 are still identical but now offset from each other along the x-axis. Crystal shifter 600 implements (a) an anchor 610 with two horizontally-offset surface portions 614A and 614B, and (b) a mount 620 with two horizontally-offset surface portions 624A and 624B. Blade flexure 230 connects between surface portion 614A of anchor 610 and surface portion 624A of mount 620, and blade flexure 232 connects between surface portion 614B of anchor 610 and surface portion 624B of mount 620. Surface portions 614A, 614B, 624A, and 624B may or may not be vertical. For example, surface portions 614A and 614B may be two different portions of a single planar surface of anchor 610 parallel to the y-axis but oriented at an oblique angle to the z-axis, and surface portions 624A and 624B may be two different portions of a single planar surface of mount 620 parallel to the y-axis but oriented at the same oblique angle to the z-axis.

Crystal shifter 300 and structure 400 may be modified in a fashion similar to the modification of crystal shifter 200 to form crystal shifter 600.

FIG. 7 is a side-view of one crystal shifter 700 where transducer 240 is disposed below blade flexures 230 and 232. In each of crystal shifters 100, 200, 300, and 600, as depicted in FIGS. 1-3C and 6, the piezoelectric bending transducer is disposed above the flexures. Similarly, structure 400 is configured for the piezoelectric bending transducer to be disposed above the flexures. However, each of these devices may be modified for the piezoelectric bending transducer to be disposed below the flexures (or even in between). This is illustrated by example in FIG. 7, where crystal shifter 700 represents such a modification of crystal shifter 200.

As compared to crystal shifter 200, crystal shifter 700 implements an anchor 710 with a notch 716 for accommodating transducer 240. Notch 716 is below the height of blade flexures 230 and 232. Transducer 240 may be affixed to one or more surfaces of notch 716, for example a downward-facing surface 712. The vertical position of notch 716 is such that transducer 240 is in contact with a downward-facing surface 722 of mount 120. Notch 716 may be sized or shaped to accommodate electrical connections to transducer 240. In crystal shifter 700, transducer 240 is capable of pushing mount 120 up, that is, in the positive z-axis direction.

Each of crystal shifters 100, 200, 300, and 600 may include two piezoelectric bending transducers, with one transducer disposed above the flexures (as shown in FIG. 1, for example) and another transducer disposed below the flexures (as shown in FIG. 7, for example). Such embodiments may have a larger range of travel for the nonlinear crystal due to the greater driving force achievable with two transducers.

FIG. 8 is a side-view of one crystal shifter 800 with a convex surface on the nonlinear-crystal mount for interfacing with transducer 240. Crystal shifter 800, as depicted in FIG. 8, represents a modification of crystal shifter 200. However, a similar modification may be applied to each of crystal shifters 100, 300, 600, and 700 and to structure 400. Crystal shifter 800 implements a mount 820 with a convex upward-facing surface 822. Throughout the working range of deformations of crystal shifter 800, corresponding to a range of bending states of transducer 240, transducer 240 is in contact with convex surface 822. As transducer 240 is bent from a planar state, the contact point shifts on convex surface 822 in a smooth manner. Convex surface 822 prevents the contact interface between transducer 240 and mount 820 from being at an edge of either one of transducer 240 and mount 820. Sharp edges are more prone to wear and tear than smooth surfaces, and dislodged material may contaminate critical surfaces of an optical system. These issues are mitigated in crystal shifter 800.

In one embodiment, the profile of convex surface 822 is cylindrical, that is, convex in the xz-dimensions and translationally symmetric along the y-axis. Alternatively, convex surface 822 may be convex both in the xz-dimensions and in the yz-dimensions, although this may complicate the manufacturing process.

In the preceding discussion, it has been assumed that the two flexures of each crystal shifter/device are planar in their unstressed state. Without departing from the scope hereof, the flexures may be non-planar in their unstressed state. Also, each of the two flexures may be implemented as a stack of leaf-springs horizontally offset from each other to encourage S-shaped deformation. In addition, blade flexures discussed above may be replaced with notch flexures, with each notch flexure including at least two notches so as to encourage S-shaped deformation.

In each of crystal shifters 100, 200, 300, 600, 700, and 800, as depicted in FIGS. 1-3C and 6-8, the piezoelectric bending transducer is longer than the flexures. For example, in crystal shifter 200, length 240L of transducer 240 exceeds length 230L of blade flexures 230 and 232. Each of these devices may instead implement a shorter piezoelectric bending transducer, provided that the anchor and/or the mount are shaped to compensate for the length of piezoelectric bending transducer failing to span across the length of the flexures.

Each of crystal shifters 100, 200, 300, 600, 700, and 800 may be modified to utilize a piezoelectric bending transducer capable of more complex bending in the xz-dimensions than a single arc. Such piezoelectric bending transducers may be made by assembling two or more or more single-arc bending transducers similar to transducer 240. One such example is illustrated in FIGS. 9A and 9B.

Figure 9A:
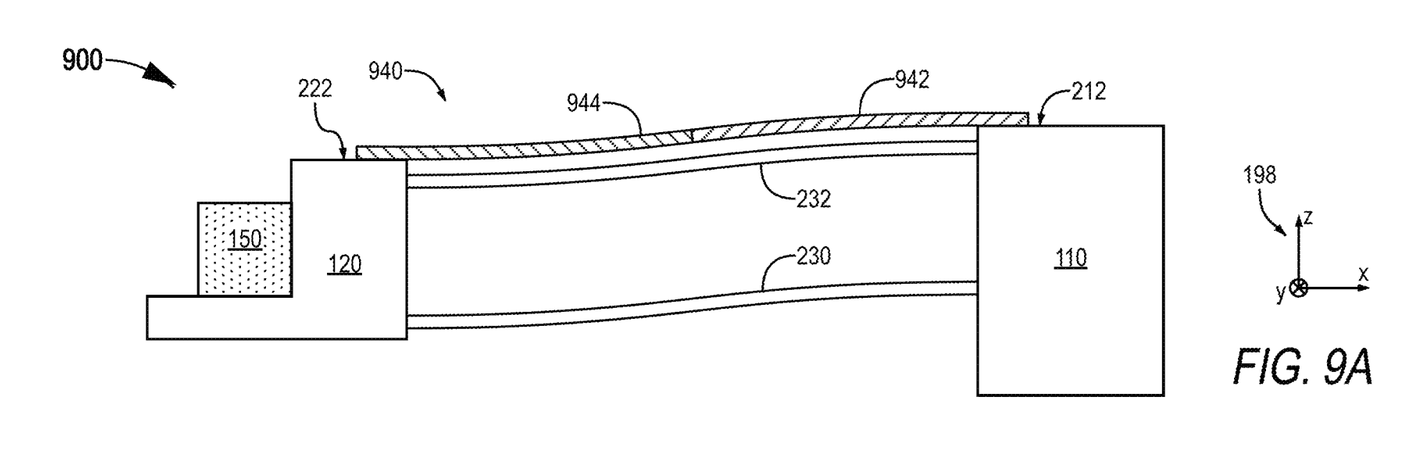
FIGS. 9A and 9B illustrate a crystal shifter with a piezoelectric bending transducer capable of S-shaped deformation, according to an embodiment.
Figure 9B:
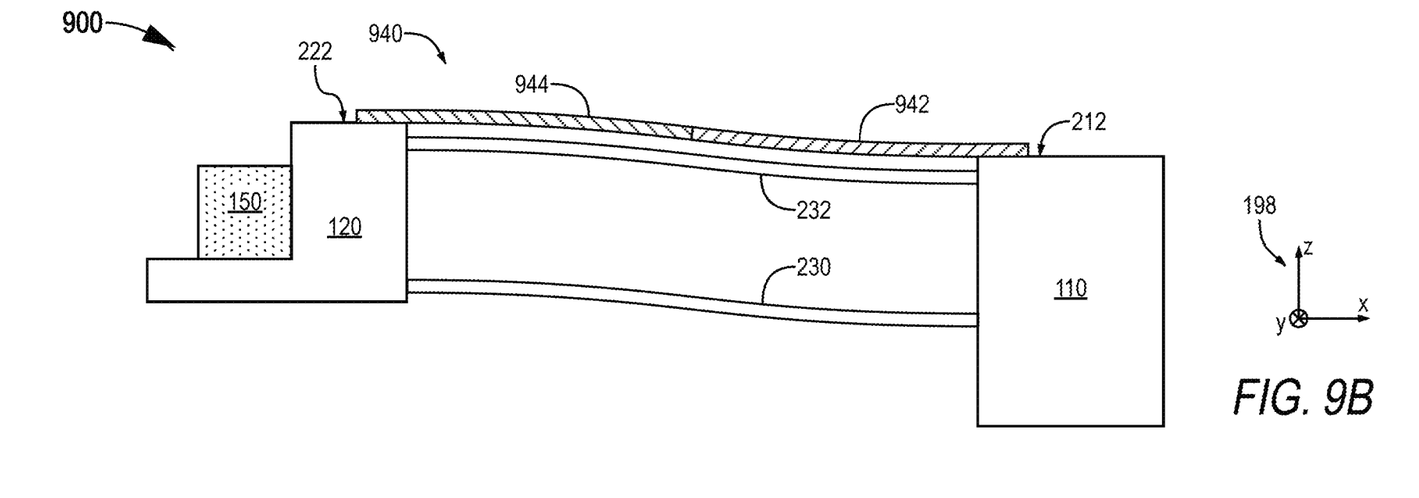

FIGS. 9A and 9B are side-views of one crystal shifter 900 with blade flexures 230 and 232, and a piezoelectric bending transducer 940 capable of S-shaped deformation similar to that of the blade flexures 230 and 232. Crystal shifter 900, as depicted in FIGS. 9A and 9B, represents a modification of crystal shifter 200. However, transducer 940 is also suitable for implementation in other embodiments of crystal shifter 100, for example in any one of crystal shifters 600, 700, and 800. FIGS. 9A and 9B show crystal shifter 900 with transducer 940 in a downward-bent state and an upward-bent state, respectively.

Transducer 940 includes piezoelectric bending transducers 942 and 944 mounted in series in the lengthwise dimension of transducer 940. Each of transducers 942 and 944 is a single-arc piezoelectric bending transducer similar to transducer 240. Transducers 942 and 944 may be operated to bend in mutually opposite directions, such that the two resulting arcs cooperate to form an S-shape. When the S-shaped deformation of transducer 940 closely mimics the S-shaped deformation of blade flexures 230 and 232, it is possible to affix transducer 940 to both upward-facing surface 212 of anchor 110 and upward-facing surface 222 of mount 120. As a result, transducer 940 is capable of both pushing mount 120 down (see FIG. 9A) and lifting mount 120 up (see FIG. 9B) relative to the position of mount 120 when blade flexures 230 and 232 are in their unstressed planar state.

Referring again more generally to crystal shifter 100 of FIG. 1, piezoelectric bending transducer 140 may be replaced with other types of actuators for vertically shifting mount 120 while benefitting from flexures 130 and 132 to prevent rotation of mount 120. In one modification, transducer 140 is replaced by a bimetallic strip. In another modification, transducer 140 is replaced by a motorized micrometer screw. While possibly suitable for some implementations, a motorized micrometer screw may be both more expensive and bulkier than transducer 140. The bimetallic strip may have formfactor and cost similar to transducer 140. However, thermal isolation between the bimetallic strip and mount 120 may be required for proper operation of the bimetallic strip if nonlinear crystal 150 is to be heated by heater 160.

Due to the cantilevered design, the crystal shifters disclosed herein may be susceptible to resonant vibrational motion excited by external sources. For example, when the crystal shifter is supported by a table that is in connection with moving parts, like a fan or a motor, vibrations from the mechanical motion of the moving parts may propagate through the table to the crystal shifter and excite resonant vibrational motion of the nonlinear crystal mount. Air disturbances caused by a forced-air climate control system may also excite such motion, and even a shock during shipping has the potential to excite long-lived resonant vibrational motion of the nonlinear crystal mount. If substantial, resonant vibrational motion of the nonlinear crystal mount may have a non-negligible effect on the performance of the nonlinear crystal. The crystal shifters disclosed herein may be designed such that their inherent resonance frequencies are away from the frequencies of the most commonly encountered external sources. In addition, the crystal shifters may implement features to dampen resonant vibrational motion.

Figure 10:
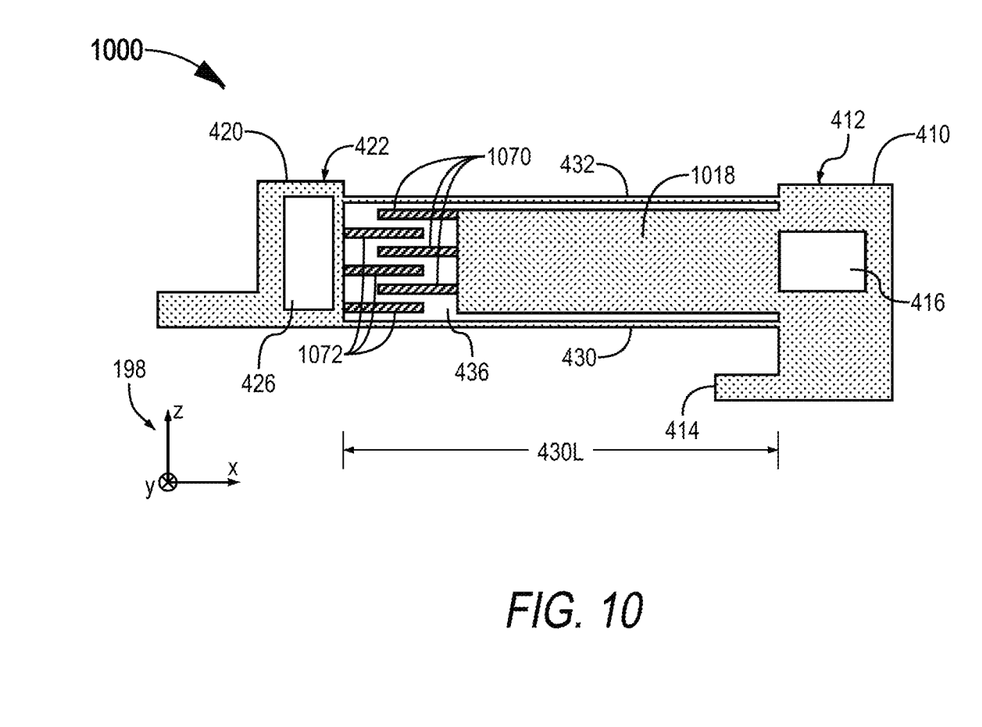
FIG. 10 illustrates a crystal shifter structure with feathers for air-damping of resonant vibrational motion of the nonlinear crystal mount, according to an embodiment.

FIG. 10 is a side-view of one crystal shifter structure 1000 with feathers for air-damping of resonant vibrational motion of the nonlinear crystal mount. Structure 1000 is an extension of structure 400, but similar modifications may be made to any one of crystal shifters 100, 200, 300, 600, 700, 800, and 900. As compared to structure 400, structure 1000 further includes a set of feather-like features 1070 extending from anchor 410 in the direction toward mount 420, and a set of feather-like features 1072 extending from mount 420 in the direction toward anchor 410. Feathers 1070 are interdigitated with feathers 1072, such that the air-resistance therebetween dampens vibrational motion of mount 420 relative to anchor 410. Anchor 410 may include a protruding feature 1018 (an example of feature 418) that extends far into aperture 436 in the direction toward mount 420, to reduce the necessary length of feathers 1070 and 1072 to achieve the interdigitated overlap and thus lend stiffness to the air-damping structure. In one example, feature 1018 extends more than half of distance 430L in the direction toward mount 420.

Feathers 1070 and 1072 may be integrally formed with the remainder of structure 1000. In one embodiment, each feather 1070 and each feather 1072 is planar and spans the full width of structure 1000 (equivalent to width 400W of structure 400 depicted in FIG. 4B). The manufacturing of this embodiment of structure 1000 may utilize wire-erosion to form feathers 1070 and 1072, as well as other portion of the structure as discussed above for structure 400 in reference to FIGS. 4A-C.

The present invention is described above in terms of a preferred embodiment and other embodiments. The invention is not limited, however, to the embodiments described and depicted herein. Rather, the invention is limited only by the claims appended hereto.

What is claimed is:

1. A device for shifting a nonlinear crystal arranged to frequency convert a laser beam, comprising:
   an anchor;
   a mount for holding the nonlinear crystal;
   two parallel flexures each interconnecting the mount and the anchor to cantilever the mount from the anchor, each flexure extending in a first horizontal direction from the mount to the anchor, the two flexures being offset from each other in a vertical direction; and a transducer connecting between the anchor and the mount;

wherein bending of the transducer shifts the position of the mount, relative to the anchor, in the vertical direction, and wherein the two parallel flexures cooperate to prevent rotation of the mount, relative to the anchor, during shifting of the mount position induced by the transducer.

2. The device of claim 1, wherein the transducer is a piezoelectric bending transducer.

3. The device of claim 1, further comprising the nonlinear crystal, wherein the nonlinear crystal is attached to the mount.

4. The device of claim 1, wherein each flexure is a blade flexure oriented to prevent flexing out of the plane containing the first horizontal direction and the vertical direction.

5. The device of claim 1, wherein the two flexures have same length in the first horizontal direction.

6. The device of claim 5, wherein the two flexures are are aligned with each other in the first horizontal direction.

7. The device of claim 1, wherein each flexure has a thickness in the vertical direction, a length in the first horizontal direction, and a width in a second horizontal direction orthogonal to the first horizontal direction, the thickness being less than each of the length and the width.

8. The device of claim 1, wherein the anchor, the mount, and the flexures are different portions of an integrally formed structure.

9. The device of claim 8, wherein the integrally formed structure is made of aluminum or an aluminum alloy.

10. The device of claim 9, wherein the integrally formed structure is plated gold to facilitate soldering of a nonlinear crystal to the mount and soldering of the anchor to a supporting structure.

11. The device of claim 8, wherein the integrally formed structure has a wire-eroded aperture defining (a) a length of the flexures in the first horizontal direction and (b) the offset between the flexures.

12. The device of claim 8, wherein the mount has a wire-eroded aperture for accommodating a heater for the nonlinear crystal.

13. The device of claim 1, wherein the transducer is offset from the flexures in the vertical direction and is a nonzero distance away from a closest one of the flexures.

14. The device of claim 13, wherein the transducer is disposed above the flexures, a first end of the transducer is affixed to an upward-facing horizontal surface of the anchor, and a second end of the transducer is in contact with an upward-facing surface of the mount.

15. The device of claim 14, wherein the contact between the second end and the upward-facing surface of the mount allows the transducer and the mount to slide relative to each other.

16. The device of claim 15, wherein, when the flexures are in their relaxed state, the upward-facing surface of the mount is vertically higher than the upward-facing horizontal surface of the anchor, corresponding to the transducer being in an upward-bent state.

17. The device of claim 16, wherein the flexures are planar in their unstressed state.

18. The device of claim 1, further comprising a heater, disposed in the mount, for heating the nonlinear crystal.

19. The device of claim 18, wherein each flexure is made of aluminum or an aluminum alloy, and wherein the cross-sectional area of each flexure, orthogonal to the first horizontal direction, is less than 2 millimeters$^2$.

20. An ultraviolet laser apparatus, comprising:

a laser source for generating a visible laser beam;

a nonlinear crystal for frequency-doubling the visible laser beam to generate an ultraviolet laser beam;

and wherein the nonlinear crystal is supported by the mount of the device of claim 1 for shifting the position of the nonlinear crystal, relative to the visible laser beam, to mitigate ultraviolet damage to the nonlinear crystal caused by the ultraviolet laser beam; and electronic circuitry for controlling bending of the transducer of the device.

\* \* \* \* \*